Figure 1:
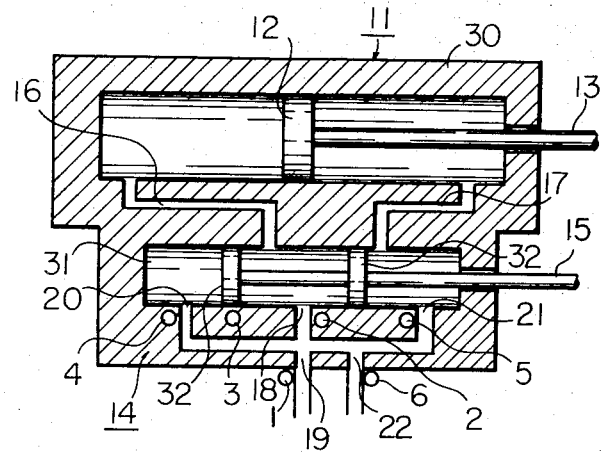

United States Patent

Takahashi

[15] 3,699,810
[45] Oct. 24, 1972

[54] DEVICE FOR MONITORING A FLUID PRESSURE SYSTEM

[72] Inventor: Senji Takahashi, Yokohama-shi, Japan

[73] Assignee: Japan Aircraft Manufacturing Company Limited, Kanagawa-ken, Japan

[22] Filed: July 16, 1970

[21] Appl. No.: 55,367

[30] Foreign Application Priority Data

April 21, 1970 Japan ..................... 45/33485

[52] U.S. Cl. ..................... 73/168, 73/341, 73/342, 73/355 R, 235/151.3, 315/25, 324/73 R, 340/324 A
[51] Int. Cl. ..................... G01k 7/00, G01m 19/00
[58] Field of Search ........ 73/168, 339 R, 339 A, 340, 73/341, 342, 343.5, 355 R, 359, 362 R, 362 AR, 362 CP, 362 TSC; 235/151.3; 315/25; 314/73 R; 340/324 A

[56] References Cited

UNITED STATES PATENTS

| | | | |
|---|---|---|---|
| 2,963,652 | 12/1960 | Taylor et al. | 324/73 X |
| 3,112,880 | 12/1963 | Pollock | 73/341 X |
| 3,350,702 | 10/1967 | Herman | 73/355 R X |
| 3,474,438 | 10/1969 | Lauher | 340/324 A |
| 3,473,079 | 10/1969 | Adornetto et al. | 315/25 X |

Primary Examiner—Louis R. Prince
Assistant Examiner—Frederick Shoon
Attorney—Robert E. Burns and Emmanuel J. Lobato

[57] ABSTRACT

A device for monitoring a fluid pressure system comprises a plurality of tranducers for individually detecting local temperatures at a plurality of locations in the system and providing corresponding electric signals, a scanner for addressing the electric signals in accordance with a prescribed program and providing corresponding output signals, a linearizer for calibrating the output signals, an AD converter for converting the calibrated output signals into corresponding digital signals, and means for visually displaying both a temperature characteristic pattern developed from the digital signals and a temperature reference pattern indicative of the acceptable temperature levels in the system whereby a comparison of the two patterns may be made to determine defective components in the fluid pressure system.

5 Claims, 5 Drawing Figures

DEVICE FOR MONITORING A FLUID PRESSURE SYSTEM

The present invention relates generally to an improved device for monitoring a pressure system, more particularly relates to a novel monitoring technique of a pressure system composed of at least one hydraulic pressure component through analysis of thermal characteristics of the system in relation to a given standard thermal reference.

The present invention is particularly applicable to the monitoring of a hydraulic pressure system such as employed in an aircraft installation and, is more advantageously, utilized in air-borne (on board aircraft) monitoring systems for aircraft installations. Therefore, the following description will be mainly focussed upon the application of the art to the case of an aircraft installation and its maintenance.

Aircraft installations such as a utility system, flight control system and/or other system of an aircraft are known to include various hydraulic components, whose malfunctions are usually caused by internal leakages, external leakages and failure of the parts. Among three causes, the external leakage and the failure of the parts of the hydraulic components can be monitored through external visual observation of the mechanism. However, the internal leakage of a component cannot be found unless the component is removed from the system and subjected to a bench test.

In this connection, the conventional maintenance work of the aircraft installation is generally performed following maintenance with a replacement schedule, in which technique a fixed time between overhaul is applied to the respective hydraulic components. When the operation period of some hydraulic component after an overhaul comes to the end of the time between overhaul, that component is removed from the system for the next overhaul regardless of its actual functional condition.

This conventional maintenance system is based on the conventional conception of the failure rate-time after overhaul relationship. This relationship is generally given in the form of a reliability curve, which curve is more popularly called as a bucket curve. In the conventional conception of the relationship, the reliability curve is supposed to show a sudden fall in the initial failure rate zone, a horizontal saturation in the random failure rate zone and a sudden rise in the wear-out failure zone. In the case of the above-mentioned maintenance on the bases of a replacement schedule system, the end of the time between overhaul is so selected as to fall on the termination of the random failure rate zone. So, if maintenance on a replacement schedule system is employed in the maintenance of an aircraft installation, all the components are thought to be replaced with new components before the time failure of the component is markably and undesirably increased.

In this connection, however, a frequent replacement of the hydraulic components is accompanied with various drawbacks from the view point of both maintenance and economy.

Replacement of a component from a system thereof is known to oftentimes cause the problem of residual stress on the remainder of the related parts of the system and such residual stress is liable to invite later development of cracks on the remainder of the system. So, the more the frequency of the replacement of the component or component from a system, the larger the possibility of later development of undesirable cracks on the related remainder components of the system.

As above-mentioned, in maintenance with a replacement schedule, the hydraulic components are replaced regardless of the actual functional condition thereof. Therefore, there is a case when even a component of perfect functional condition is subjected to replacement and subsequent overhaul. This is a loss of time and a loss of work.

Further, in the conventional technique of monitoring, the hydraulic components removed from the system has to be disassembled for checking the internal failure, such as wearing out, of the internal parts. Such troublesome work naturally results in increasing or extending time necessary for the maintenance work.

In the aircraft transportation business, the economy in the business is usually evaluated by the ratio of the downtime cost with respect to maintenance cost. In the case of conventional size aircraft this ratio is in a range from 1.0 to 2.0. However, in the case of aircraft of extraordinary size, such as a jumbo jet plane, this ratio is known to be in the range from 2.7 to 4.3. So, with recent developments in the size of aircraft, there is a strong desire in the aircraft transportation business to find out a way to decrease this ratio at least to the extent of the aircraft of ordinary size. For this desired decrease of the ratio, it is necessary to bring about a considerable decrease in the downtime cost, namely the length of the downtime of the aircraft.

One of the solutions may be provided by extending the time between overhauls and another solution may be provided by undertaking the monitoring of the component in the air-borne system.

In this connection, the recently developed investigation of the above-described reliability curve has revealed that the failure rate curve does not actually show a sudden rise even in the wear-out failure zone. This implies that there is no need of selecting the end of the time between overhaul so as to have it fall on the termination of the random failure zone and that the hydraulic component may be perfect in its function even in the wear-out failure zone. From this newly obtained result of the analysis of the reliability curve, it can be deduced that a hydraulic component of the aircraft installation needs not be removed and subjected to overhaul oven at and after the end of the time between overhaul, provided that only the monitoring of its function is pertinently performed. This conception has brought about a new technique of aircraft maintenance popularly called as the "on condition maintenance system".

In this new maintenance system, the function of the hydraulic components of an aircraft installation can be monitored without removing the components from the systems on the aircraft or, it the component itself is removed from the system on the aircraft, without disassembling the component itself. Only when the malfunction of the component itself is confirmed, is the component or the assembly of components subjected to overhaul work.

One of the typical examples of this on condition maintenance system is found in the TARAN system employed by United Air Lines, TARAN meaning test and replace as necessary. In this maintenance system, a particular installation or system of an aircraft, for example a landing gear system, is disengaged from the usual pressure circuit and a TARAN TESTER comprising a hydro-pump and flow meters is inserted into the system's circuit. In this technique, the particular system's circuit can be isolated from its related installation parts and the functional condition of the system as a whole can be monitored without removing the system from the aircraft. The monitoring of the function in this technique is empirically known to be performed with success at a probability of about 70 percent. However, firstly, although a particular system of the aircraft installation can be isolated regarding the functional condition from its related parts of the installation in this technique, individual components or assembly of the components construction in the system cannot be isolated in this technique. This means that the functional condition of the individual component can not be monitored successfully through application of this technique. Secondly, this technique cannot be applied to an air-borne-system.

Therefore, there has been no attempt to develop a maintenance technique which can successfully ascertain a monitoring technique applicable to air-borne-systems and a monitoring system performable without removal of the individual hydraulic components from a hydraulic or pressure system of an aircraft installation.

A principal object of the present invention is to provide a device for monitoring a pressure system composed of at least one pressure component without removing the component or components from the system.

Another object of the present invention is to provide a device for monitoring a pressure system capable of checking internal failures of a component in the system without disassembling the component.

Still another object of the present invention is to provide a monitoring device for a pressure system advantageously applicable to aircraft installation maintenance with successful prolongation of the time between overhaul of the components.

Still another object for the present invention is to provide a monitoring device of a pressure system capable of ascertaining success in an on condition maintenance system in aircraft installation maintenance work.

Still another object of the present invention is to provide a monitoring device for a pressure system capable of ascertaining success in the employment of an air-borne-system in the aircraft installation maintenance.

Still another object of the present invention is to provide a monitoring device for a pressure system capable of, when employed in aircraft installation maintenance work minimizing the ratio of downtime cost with respect to the maintenance cost in the aircraft transportation business.

In order to achieve the above-recited objects, in the monitoring system of the present invention, local thermal conditions of a component or components, after a preset time operation thereof, are detected by transducer means disposed at selected points substantially along a pressure circuit passing through the component or components of the pressure system and are connected into corresponding electric signals. Next, the electric signals are scanned by a scanner and resultant sequential pulse signals, which, after DC amplification and calibration, are applied to an AD converter for analogue-digital conversion. The digital signals, obtained are, via a processor, displayed in a form of a thermal characteristic pattern on a display screen together with a thermal reference pattern resulting from reference inputs to the processor. When deviation of the thermal characteristic pattern from the thermal reference pattern is recognized, the component or components are removed from the system for replacement.

Figure 2:
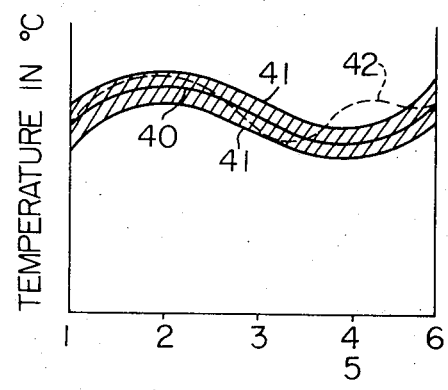
Figure 3:
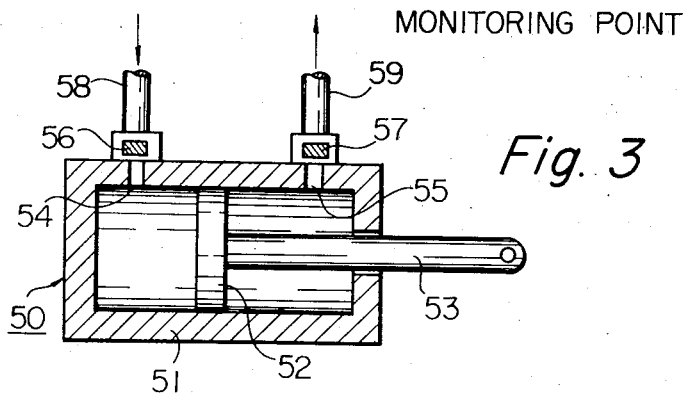
Figure 4:
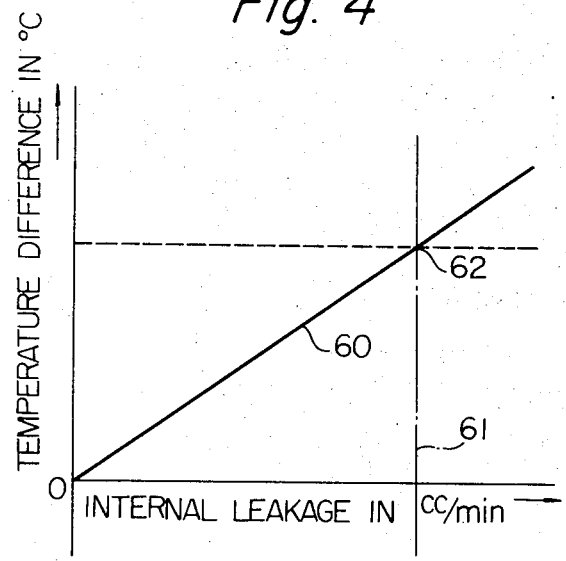
Figure 5:
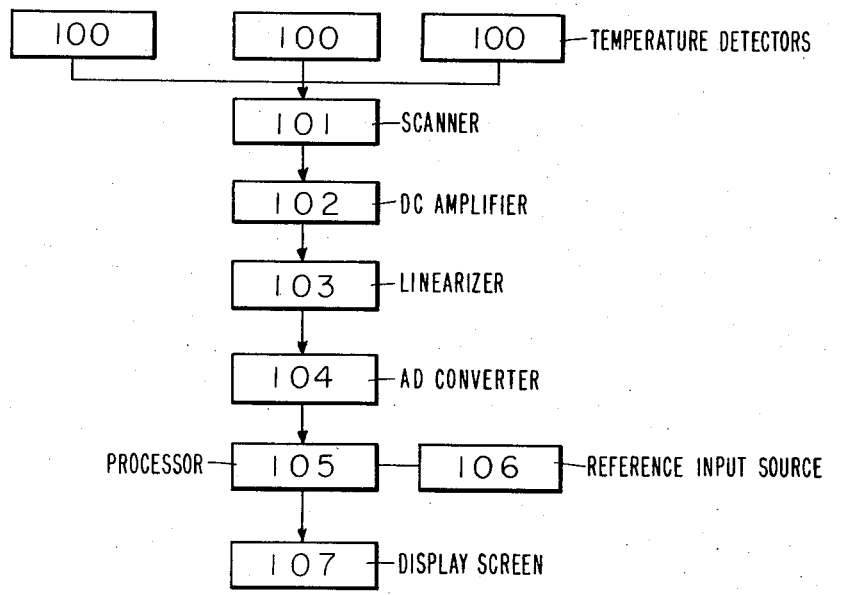

Other features and advantages of the present invention will be made more apparent from the ensuing description, reference being made to the accompanying drawings in which;

FIG. 1 is a fragmentary sectional view of an embodiment of an apparatus wherein the device of the present invention is employed, FIG. 2 is a graphical representation of a display on a display screen used in the device of the present invention, FIG. 3 is a fragmentary sectional view of another embodiment of the arrangement wherein the method of the present invention is employed, FIG. 4 is a graphical representation of a display on a display screen used in the device of the present invention, FIG. 5 is a block diagram illustrating a typical arrangement of the device of the present invention.

Referring to FIG. 1, there is shown an embodiment of an arrangement wherein the device of the present invention is employed. In the apparatus 11, two correlated hydraulic pressure components are provided, one being a piston cylinder 30 and another being a spool valve 14. The piston cylinder 30 is provided with a piston 12 reciprocable therein a piston rod 13, one end of which is fixed to the piston 12 and another end of which is related to an external driving mechanism, not shown, to be driven reciprocably thereby. The cylinder 30 slidably encases the piston 12. The spool valve component 14 is provided with a conduit 19 having an opening 18 to an internal cavity or chamber 31 thereof and another conduit 22 having two openings 20 and 21 to the internal chamber or cavity 31. Both conduits 19 and 22 are connected to a hydraulic pressure source, not shown. The cavity 31 is provided with a pair of spool valves 32 reciprocable therein and fixedly mounted on a spool valve rod 15 externally connected to an operating source, not shown. The piston component or cylinder 30 and the spool valve component 14 are interconnected by two oil paths 16 and 17 opening on opposite sides of the piston when the piston is intermediate thereof. In the above-explained arrangement, temperature detectors 1 to 6 are located at selected points substantially along the advancing path of the oil as shown in the drawing.

In the above-described arrangement, when the spool valve 32 is provided with a reciprocal movement in the cavity 31 of the spool valve component 14, the pressure oil will be introduced into the cylinder component 30 and this effects the reciprocal movement of the piston 12 and the running of the arrangement is effected. The subsequent continuous running of the arrangement will cause a temperature change in the various parts thereof and this temperature condition is detected at the selected points by the temperature detectors 1 to 6.

By using the device later explained in detail, thusly monitored temperatures are displayed in a form of a curve 42 visually displated on a display screen as shown in FIG. 2, wherein the monitoring points are plotted on the abscissa whereas the monitored temperatures are plotted on the ordinate. As already described, the screen is provided with a reference temperature pattern 40 with its tolerance limits 41. When the curve 42 falls outside the tolerance limits 41, the monitoring point corresponding to such portion of the curve is regarded as abnormal in its function. For example, in the case shown, a part of the curve is outside the permissible limits in this case the monitoring points 4 and 5 are found to be out of order, that is the readings taken through the corresponding openings 20 and 21 are found to be out of order. When this malfunction is confirmed, the arrangement is removed from the entire system to which the arrangement is attached and is subjected to overhaul.

Another embodiment of the arrangement wherein the device of the present invention is employed is shown in FIG. 3. In this case, the arrangement is composed of a piston component 50 only. The piston component 50 includes a cylinder 51, a piston 52 reciprocable in the cylinder 51, a piston rod 53 one end of which is fixed to the piston 52 and another end of which is connected to a not shown external mechanism to be operated thereby and a pair of oil paths 58 and 59, each having an opening 54 and 55 to the chamber of the cylinder 51. The openings 54 and 55 are provided with temperature detectors 56 and 57, respectively. After a preset time of operation of the arrangement, the temperature difference between the points 56 and 57 are shown in a form of a visible plot on the display screen shown in FIG. 4, wherein the temperature difference is plotted on the ordinate whereas the internal leakage magnitude is plotted on the abscissa. As already mentioned, the screen is provided with a temperature difference reference pattern 60 with an allowable internal leakage limit 61.

When the monitored temperature difference plot falls beyond the allowable limit point 62, which is given as the cross point of the pattern 60 with the limit 61, the arrangement is regarded as abnormal in its function and is subjected to removal from the entire system to which the arrangement is attached for replacement purposes.

As is mentioned above, it is desirable in the art of the present invention to interpret the monitored thermal magnitude into a visible pattern on a given display screen in an electrical manner together with the thermal reference pattern. Some practical examples for effecting this interpretation will be explained in the following description.

Referring to FIG. 5, a typical arrangement for effecting the above-mentioned interpretation is shown.

The temperatures of the selected points are detected by temperature detectors 100 and converted into corresponding electric signals. The temperature detector may be constructed in the form of a thermoelectric couple, a bridge circuit or an infrared temperature detector. The obtained electric signals are simultaneously introduced into a scanner 101 for addressing in a prescribed sequential programme. The output signal of the scanner 101 is brought, via a DC amplifier 102, into a linearizer 103 for calibration purpose. The calibrated analogue signals are converted into corresponding digital signals by passing through an AD converter 104 connected to the linearizer 103. Thusly obtained digital signals are applied to a processor 105 for comparison with the reference input supplied from a reference input source 106 connected to the processor 105. The output signal of the processor 105 corresponding to the monitored temperatures together with those corresponding to the reference input are supplied to a display screen 107 for a visible display purpose.

The output signals of the processor 105 may be brought into a pertinent memory device such as a magnetic taping device for a data recording purpose. The output signals of the processor 105 may be used for direct visual indication of a "good" or "no good" condition, for example by indicator lamps.

By inserting a digital timer into the arrangement in a known manner, the monitoring can be performed periodically with desired intervals.

What is claimed is:

1. An improved device for monitoring a pressure system composed of at least one pressure component comprising; in combination,
    a. transducer means for detecting local thermal conditions within a pressure circuit passing through a pressure component and converting them into corresponding electric signals and disposed at selected points along the pressure circuit through said component, of a pressure system,
    b. a scanner connected to said transducer means for addressing said electric signals following a prescribed sequential programme,
    c. A DC amplifier connected to amplify the output of said scanner,
    d. a linearizer connected to said DC amplifier for calibrating the output signals of the amplifier,
    e. an AD converter connected to said linearizer for converting output signals of the linearizer into corresponding digital signals,
    f. a processor connected to said AD converter and receptive of said output digital signals,
    g. a reference input source connected to said processor and
    h. a display screen connected to said processor for displaying a thermal characteristic pattern composed of said digital signals simultaneously together with a thermal reference pattern composed of said reference input for comparing the patterns.

2. An improved monitoring device of claim 1, wherein said transducer means comprises thermoelectric couple means.

3. An improved monitoring device of claim 1, wherein said transducer means comprises a bridge circuit.

4. An improved monitoring device of claim 1, wherein said transducer means is an infrared temperature detector.

5. An improved monitoring device of claim 1, further comprising a digital timer for performing the monitoring operation periodically at desired intervals.

* * * * *